United States Patent
Ong et al.

(10) Patent No.: US 11,165,992 B1
(45) Date of Patent: Nov. 2, 2021

(54) SYSTEM AND METHOD FOR GENERATING A COMPOSITED VIDEO LAYOUT OF FACIAL IMAGES IN A VIDEO CONFERENCE

(71) Applicant: Dell Products L.P., Round Rock, TX (US)

(72) Inventors: Chin Leong Ong, Singapore (SG); Seng Khoon Teh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/149,938

(22) Filed: Jan. 15, 2021

(51) Int. Cl.
*H04N 7/15* (2006.01)
*G06K 9/00* (2006.01)
*H04N 7/14* (2006.01)

(52) U.S. Cl.
CPC ......... *H04N 7/157* (2013.01); *G06K 9/00255* (2013.01); *G06K 9/00275* (2013.01); *H04N 7/147* (2013.01); *H04N 7/152* (2013.01)

(58) Field of Classification Search
CPC .................. H04N 7/15; G06K 9/00268; G06T 2207/20084; G06T 2207/3021; G06T 2207/20081
USPC ........................................... 348/14.01–14.16
See application file for complete search history.

(56) References Cited

U.S. PATENT DOCUMENTS

| | | | |
|---|---|---|---|
| 10,628,931 B1* | 4/2020 | Ramos | G06K 9/00268 |
| 2009/0210491 A1* | 8/2009 | Thakkar | G06Q 10/103 709/204 |
| 2013/0106988 A1* | 5/2013 | Davis | H04L 65/403 348/14.09 |
| 2018/0268200 A1* | 9/2018 | Bandameedipalli | G06Q 10/105 |
| 2019/0230310 A1* | 7/2019 | Faulkner | H04N 7/147 |
| 2020/0344278 A1* | 10/2020 | Mackell | G06K 9/00671 |

OTHER PUBLICATIONS

Fulgeri et al., Can adversarial networks hallucinate occluded people with a plausible aspect, Computer Vision and Image Understanding, vol. 182, May 2019, pp. 71-80.

Sam Et Al., Locate, Size and Count: Accurately Resolving People in Dense Crowds via Detection, IEEE Transactions on Pattern Analysis and Machine Intelligence, 2020.

(Continued)

*Primary Examiner* — Melur Ramakrishnaiah
(74) *Attorney, Agent, or Firm* — Terrile, Cannatti & Chambers; Stephen A. Terrile (57) ABSTRACT

A method, system, and computer-usable medium are disclosed for generating a composited video layout of facial images in a video conference. In at least one embodiment, a computer-implemented method includes receiving a video frame from a video source, where the video frame includes faces of individuals engaged in a video conference; generating, from the received video frame, a windowed image for each face in the video frame; generating a composite video frame including the windowed images; and providing the composite video frame for use as video of a video-conferencing application. Other embodiments include corresponding computer systems, apparatus, and computer programs recorded on one or more computer storage devices, each configured to perform the actions of the methods.

20 Claims, 9 Drawing Sheets

(56) References Cited

OTHER PUBLICATIONS

Poly, Video Conferencing, retrieved from the internet Jan. 15, 2021, https://www.poly.com/sg/en/products/video-conferencing/studio/studio-x50.

Jabra, Panacast, retrieved from the internet Jan. 15, 2021, https://www.jabra.sg/business/video-conferencing/jabra-panacast.

Pepix, Adaptive Composition, retrieved from the internet Jan. 15, 2021, https://www.pexip.com/features/adaptive-composition.

\* cited by examiner

SYSTEM AND METHOD FOR GENERATING A COMPOSITED VIDEO LAYOUT OF FACIAL IMAGES IN A VIDEO CONFERENCE

BACKGROUND OF THE INVENTION

Field of the Invention

The present invention relates to information handling systems. More specifically, embodiments of the invention relate to a system and method for generating a composited video layout of facial images in a video conference.

Description of the Related Art

As the value and use of information continue to increase, individuals and businesses seek additional ways to process and store information. One option available to users is an information handling system (IHS). An IHS generally processes, compiles, stores, and/or communicates information or data for business, personal, or other purposes thereby allowing users to take advantage of the value of the information. Because technology and information handling needs and requirements vary between different users or applications, IHS may also vary regarding what information is handled, how the information is handled, how much information is processed, stored, or communicated, and how quickly and efficiently the information may be processed, stored, or communicated. IHS variations allow for information handling systems to be general or configured for a specific user or specific use such as financial transaction processing, airline reservations, enterprise data storage, or global communications. In addition, information handling systems may include various hardware and software components that may be configured to process, store, and communicate information and may include one or more computer systems, data storage systems, and networking systems.

IHS may be used to implement video-conferencing systems in which one or more individuals at a site conduct a conference with one or more individuals at another site. To this end, the IHS may execute video-conferencing applications that interface with respective cameras and microphones at the different sites.

SUMMARY OF THE INVENTION

A system of one or more computers can be configured to perform particular operations or actions by virtue of having software, firmware, hardware, or a combination of them installed on the system that in operation causes or cause the system to generate a composited video layout of facial images in a video conference.

At least one embodiment is directed to a computer-implemented method. The computer-implemented method includes receiving a video frame from a video source, where the video frame includes faces of individuals engaged in a video conference; generating, from the received video frame, a windowed image for each face in the video frame; generating a composite video frame including the windowed images; and providing the composite video frame for use as video of a video-conferencing application. Other embodiments of this aspect include corresponding computer systems, apparatus, and computer programs recorded on one or more computer storage devices, each configured to perform the actions of the methods.

At least one embodiment includes executing a crowd counting operation on the video frame to determine the location of each face in the video frame; and executing a face detection operation using the location of each face as determined by the crowd counting operation, where the face detection operation extracts facial features of the faces located in the video frame.

At least one embodiment includes using each face's extracted features to construct a facial image for each face of the individuals in the video frame. The face recovery operation restores the obstructed facial image's facial features missing from the video frame to generate a recovered facial image. The windowed image for the obstructed facial image may be generated using the recovered facial image.

In at least one embodiment, the facial images are scaled so that the scaled facial images have approximately the same dimensions.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Systems, methods, and computer-readable medium are disclosed for use in video-conferencing systems. Certain embodiments are well suited for use in video conferences in which multiple participants at a given site engage in the conference using a limited number of cameras when compared to the total number of participants. For example, many video-conferencing systems comprise a single camera in a single conference room. The single camera is typically positioned to encompass a wide enough field of view to capture video of multiple individuals participating in the conference. The camera captures the video of the entire group of participants and transmits the video to the video-conferencing system of other participants at other locations. The video stream includes images of all participants within the field of view of the camera as they are arranged in the conference room. Participants that are closer to the camera appear larger than participants that are further removed from the camera. Additionally, certain participants may be wholly or partially obscured from view by virtue of being behind another participant or object in the conference room.

Certain embodiments of the disclosed systems recognize that it may be difficult for individuals to actively track and engage multiple participants during a conference when the participants are presented before the camera as a single group. The disclosed systems generate a composited video layout of faces of the multiple individuals participating in the conference to address this difficulty. In certain embodiments, a windowed image for each face within the field of view of the camera is generated and subject to processing. The windowed images for each face are composited and presented in a single video transmission (e.g., a video stream) in an aesthetically pleasing arrangement. In certain embodiments, portions of the faces of individuals that are obstructed from view are reconstructed in a face recovery operation to recover the obstructed facial features. In certain embodiments, the facial images are scaled so that the faces of participants far from the camera have the same general dimensions as participants that are close to the camera.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 1:
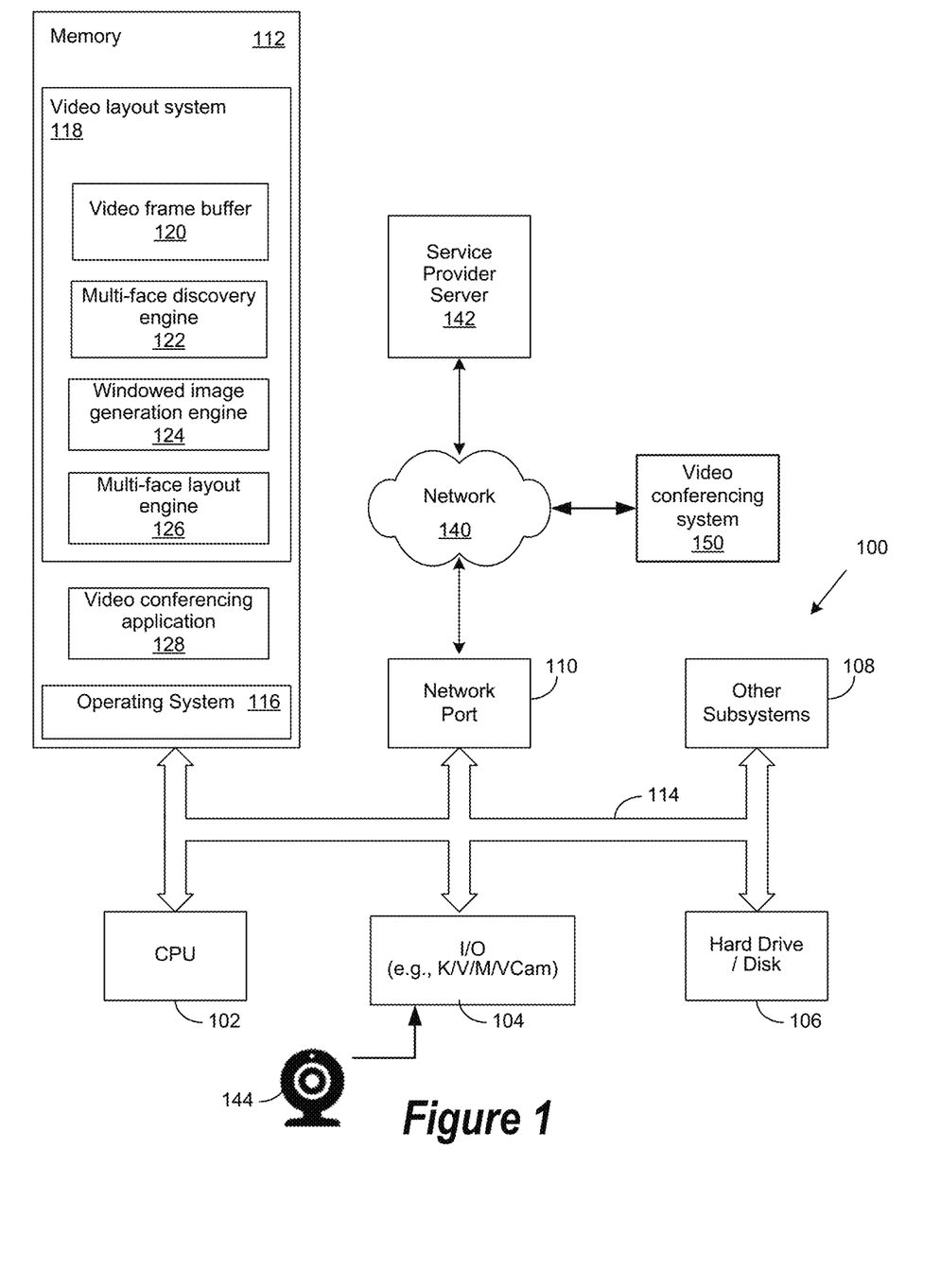
FIG. 1 is a generalized illustration of an information handling system that is configured as a video-conferencing system in accordance with certain embodiments of the system and method of the present disclosure.

FIG. 1 is a generalized illustration of an information handling system that is configured as a video conferencing system 100 in accordance with certain embodiments of the system and method of the present disclosure. The video conferencing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the video conferencing system 100 also includes network port 110 operable to connect to a network 140, which is likewise accessible by a service provider server 142. The video conferencing system 100 likewise includes system memory 112, which is interconnected to the foregoing via one or more buses 114. System memory 112 further comprises an operating system (OS) 116 and in various embodiments may also comprise a video layout system 118 and a video conferencing application 128. In certain embodiments, the video conferencing application 128 is an integrated part of the video layout system 118. In certain embodiments, the video layout system 118 is a separate component and/or add-on to the video conferencing application 128.

In certain embodiments, the video layout system 118 is configured to receive a video frame, locate faces within the video frame, generate a windowed image for each face and the video frame, and generate a composite video frame including the windowed images. The composite video frame is provided for use by the video conferencing application 128.

In the example shown in FIG. 1, the video layout system 118 includes a video frame buffer 120, which is configured to store video frames received from camera 144. In certain embodiments, camera 144 is positioned within, for example, a conference room and has a field of view that is large enough to include multiple participants in the video conference room that are participating in a video conference.

The video layout system 118 may also include a multi-face discovery engine 122. In certain embodiments, the multi-face discovery engine 122 is configured to detect faces in one or more video frames in the video frame buffer 120. Images of the detected faces may be used by the multi-face discovery engine 122 to generate facial images for each participant detected in the video frame. In certain embodiments, the facial images generated by the multi-face discovery engine 122 are provided to a windowed image generation engine 124. The windowed image generation engine 124 may be configured to generate a windowed image for each facial image generated by the multi-face discovery engine 122.

The windowed images of the video conference participants may be provided to a multi-face layout engine 126. In certain embodiments, the multi-face layout engine 126 takes each of the windowed images and places them in separate windows of a video frame to generate a composite video that is provided to the video conferencing application 128 for transmission through the network 140 for display at a further video conferencing system 150.

Figure 2:
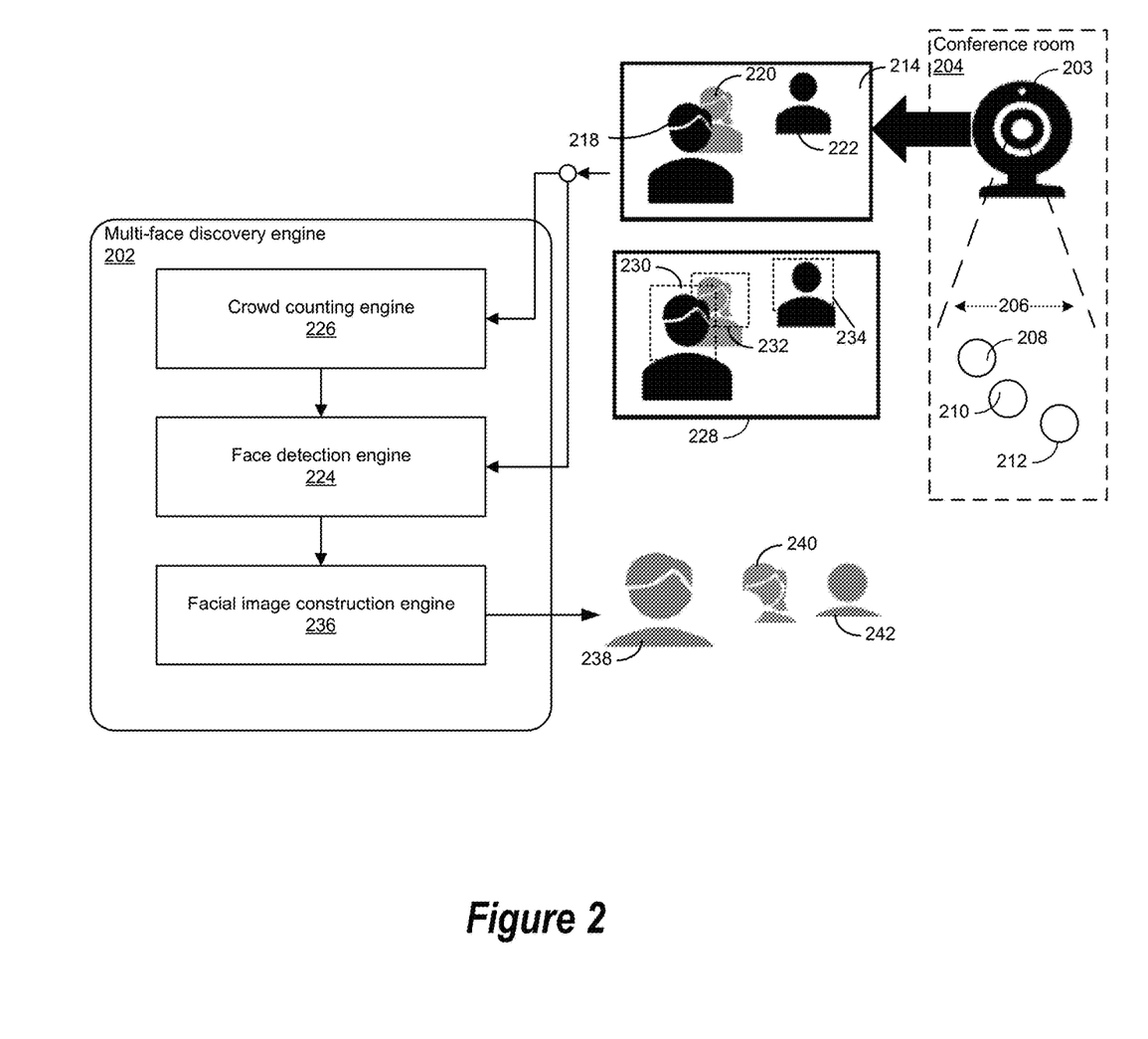
FIG. 2 depicts an exemplary embodiment of a multi-face discovery engine that may be used in certain embodiments of the disclosed system.

FIG. 2 depicts an exemplary embodiment of a multi-face discovery engine 202 that may be used in certain embodiments of the video layout system 118. In this example, a camera 203 is located in a conference room 204. The camera 203 has a field of view 206 that encompasses individual video conference participants 208, 210, and 212. The camera 203 is used to generate a video frame 214, including a face 218 of participant 208, a face 220 of participant 210, and face 222 of participant 212. In certain embodiments, the video frame 214 is stored in a video frame buffer, such as video frame buffer 120 shown in FIG. 1.

The multi-face discovery engine 202 receives video frame 214 at a face detection engine 224. In some embodiments, the video frame 214 is also received at a crowd counting engine 226. The crowd counting engine 226 may be configured to identify the locations of faces in the video frame 214. In certain embodiments, the locations of the faces in the video frame may be identified by the crowd counting engine 226 using bounding boxes. Crowd counting engine 226 may be configured to detect and identify the location of the faces of the video conference participants even when some of the faces of the participants are obstructed. In certain embodiments, the crowd counting engine 226 is implemented using a trained crowd counting inference model.

An example of a video frame in which the crowd counting engine 226 has located the faces 218, 220, and 222 of the video conference participants 208 210, and 212 is shown at frame 228. In this example, face 218 is located within bounding box 230. Face 220 is located within bounding box 232. Face 222 is located within bounding box 234.

In certain embodiments, the faces within the bounding boxes 230, 232, and 234 are detected by the face detection engine 224. The face detection engine 224 may be configured to extract the facial features of faces within the bounding boxes 230, 232, and 234. The facial features extracted by the face detection engine 224 may be provided to a facial image construction engine 236. The facial image construction engine 236, in turn, may be configured to generate a facial image for each face within the bounding boxes 230, 232, and 234. In this example, the facial image construction engine 236 has generated a facial image 238 for participant 208, a facial image 240 for participant 210, and a facial image 242 for participant 212.

Figure 3:
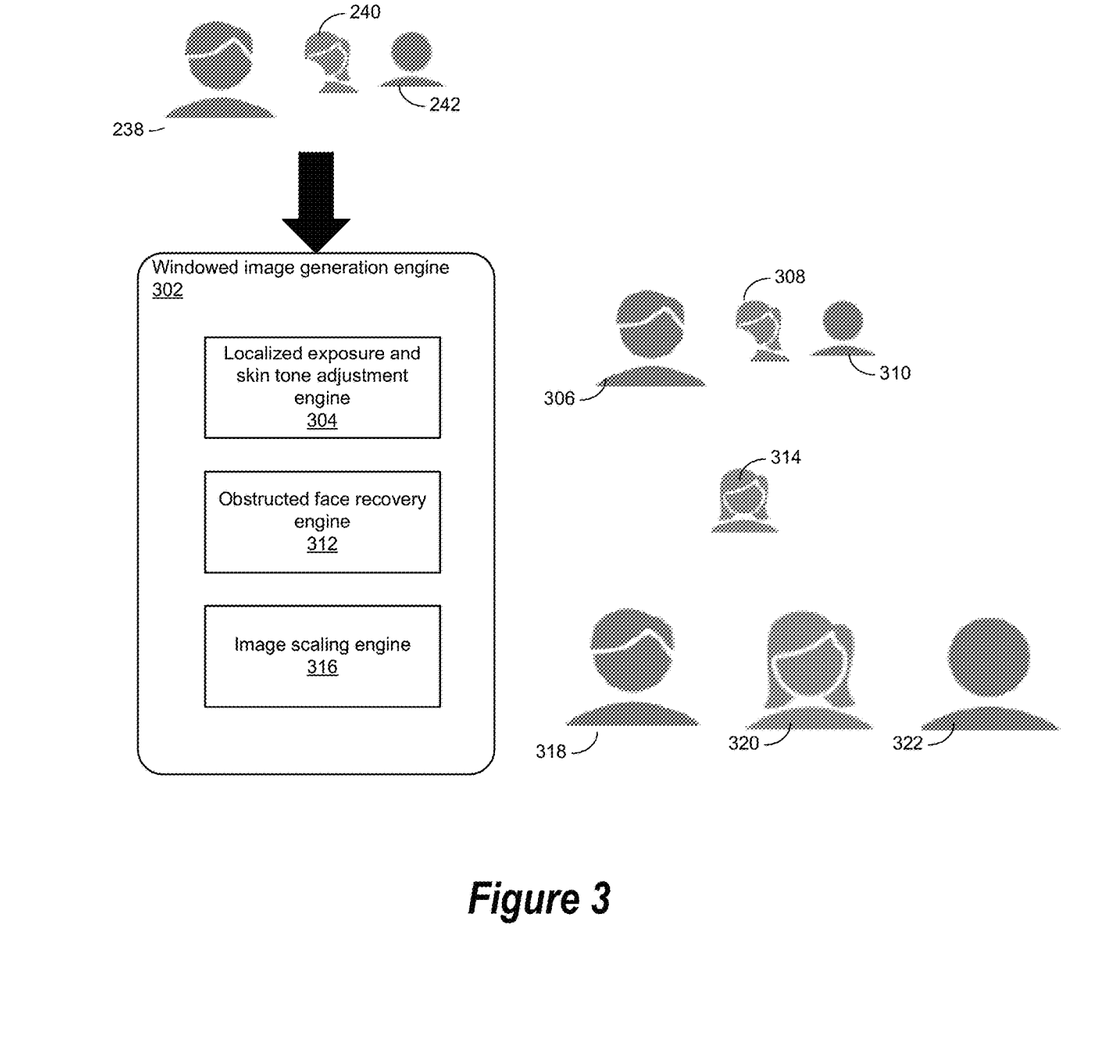
FIG. 3 depicts an exemplary embodiment of a windowed image generation engine that may be used in certain embodiments of the disclosed system.

FIG. 3 depicts an exemplary embodiment of a windowed image generation engine 302 that may be used in certain embodiments of the video layout system 118. In this example, the windowed image generation engine 302 receives facial images 238, 240, and 242 to execute further processing operations. Here, the facial images 238, 240, and 242 are provided to a localized exposure and skin tone adjustment engine 304. The localized exposure and skin tone adjustment engine 304 may execute exposure and skin tone processes to generate enhanced facial images 306, 308, and 310 for each of the facial images 238, 240, and 242. The parameters used in executing the exposure and skin tone adjustment operations may be selected so that the enhanced facial images 306, 308, and 310 have a consistent quality.

In certain embodiments, the enhanced facial images 306, 308, and 310 are provided to an obstructed face recovery engine 312. The obstructed face recovery engine 312 may analyze facial images 306, 308, and 310 to determine whether any of the facial images is the face of obstructed participant. To this end, the obstructed face recovery engine 312 may check each facial image 306, 308, and 310 to determine whether each image includes an entire face. Other means of detecting whether a face is obstructed or otherwise incomplete may also be employed.

In FIG. 3, facial image 308 of participant 210 is incomplete and, therefore, is detected as an obstructed face. Certain embodiments of the obstructed face recovery engine 312 may include a trained obstructed face inference model that is configured to reconstruct missing portions of the obstructed face. Here, the obstructed face recovery engine 312 has executed reconstruction operations on facial image 308 to provide a complete facial image 314 for participant 210.

Certain embodiments of the windowed image generation engine 302 may include an image scaling engine 316. The image scaling engine 316 may be used to generate scaled facial images 318, 320, and 322 for each participant. The faces of the scaled facial images 318, 320, and 322 may have the same general dimensions. As such, the faces of participants distant from the camera 203 appear to have the same size as the faces of participants closer to the camera 203. In certain embodiments, the image scaling engine 316 executes a super-resolution up-scaling of the facial images 306, 314, and 310 as part of the scaling operations.

Figure 4:
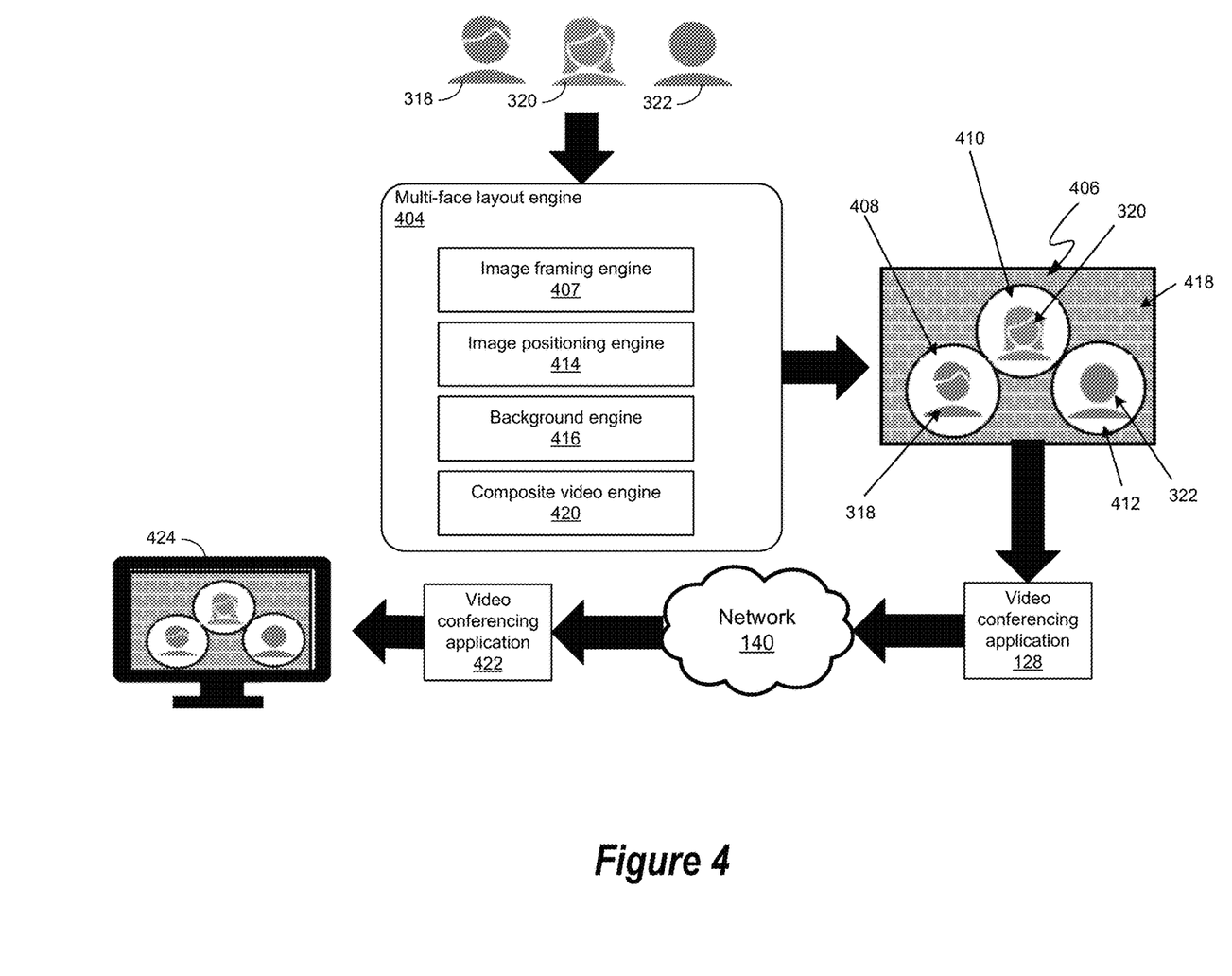
FIG. 4 depicts an exemplary embodiment of a multi-face layout engine that may be employed in certain embodiments of the disclosed system.

FIG. 4 depicts an exemplary embodiment of a multi-face layout engine 404 that may be employed in certain embodiments of the video layout system 118. In this example, the multi-face layout engine 404 is used to generate a composited video frame 406 that includes the scaled facial image 318, 320, and 322 in respective window images 408, 410, and 412. Pursuant to generating the composited video frame 406, the embodiment of the multi-face layout engine 404 shown in FIG. 4 provides the scaled facial images 318, 320, and 322 to an image framing engine 407, which uses each of the scaled facial images 318, 320, and 322 to generate the respective windowed images 408, 410, and 412. The image framing engine 407 may be configured to define the boundaries of each windowed image so that each windowed image has a predefined shape. In FIG. 4, each of the windowed images 408, 410, and 412 are circular in shape. However, other shapes and/or shape combinations may be used to define the boundaries of the windowed images, the circular shape shown in FIG. 4 merely constituting one example.

Certain embodiments of the multi-face layout engine 404 may include an image positioning engine 414 and a background engine 416. The image positioning engine 414 may be configured to place the windowed images 408, 410, and 412 at predetermined portions of the composited video frame 406 against a background 418 generated by the background engine 416.

Certain embodiments of the multi-face layout engine 404 may include a composite video engine 420. In certain embodiments, the composite video engine 420 takes the windowed images provided by the image framing engine 407 and locates the windowed images at respective positions within the composited video frame 406 against the background 418 provided by the background engine 416.

In the example shown in FIG. 4, the composited video frame 406 is provided to the video conferencing application 128, which is used to transmit the composited video frame 406 over the network 140. The transmission, including the composited video frame 406, is received at a corresponding video-conferencing application 422 of the video conferencing system 150, where it is displayed to participants at the video conferencing system 150 on a monitor 424.

In certain embodiments, the camera 203 captures video frames at a predetermined frame rate, such as 30 frames per second. Certain embodiments of the video layout system 118 are configured to generate a new composited video frame 406 for each video frame captured by the camera 203. Additionally, or in the alternative, the video layout system 118 may limit the generation of new composited video frames to instances in which a new video frame has image characteristics that differ from the characteristics of one or more prior video frames by a predetermined factor. In certain embodiments, new composited video frames are generated by the video layout system 118 to provide a continuous video stream in which movements of the participants 208, 210, and 212 are fluid and natural. Further, certain embodiments are configured to track the movement of the participants 208, 210, and 212 in a manner that ensures that the windowed images consistently reflect current images of the corresponding participants even when the participants move about within the field of view 206 of the camera 203 within the conference room 204.

Figure 5:
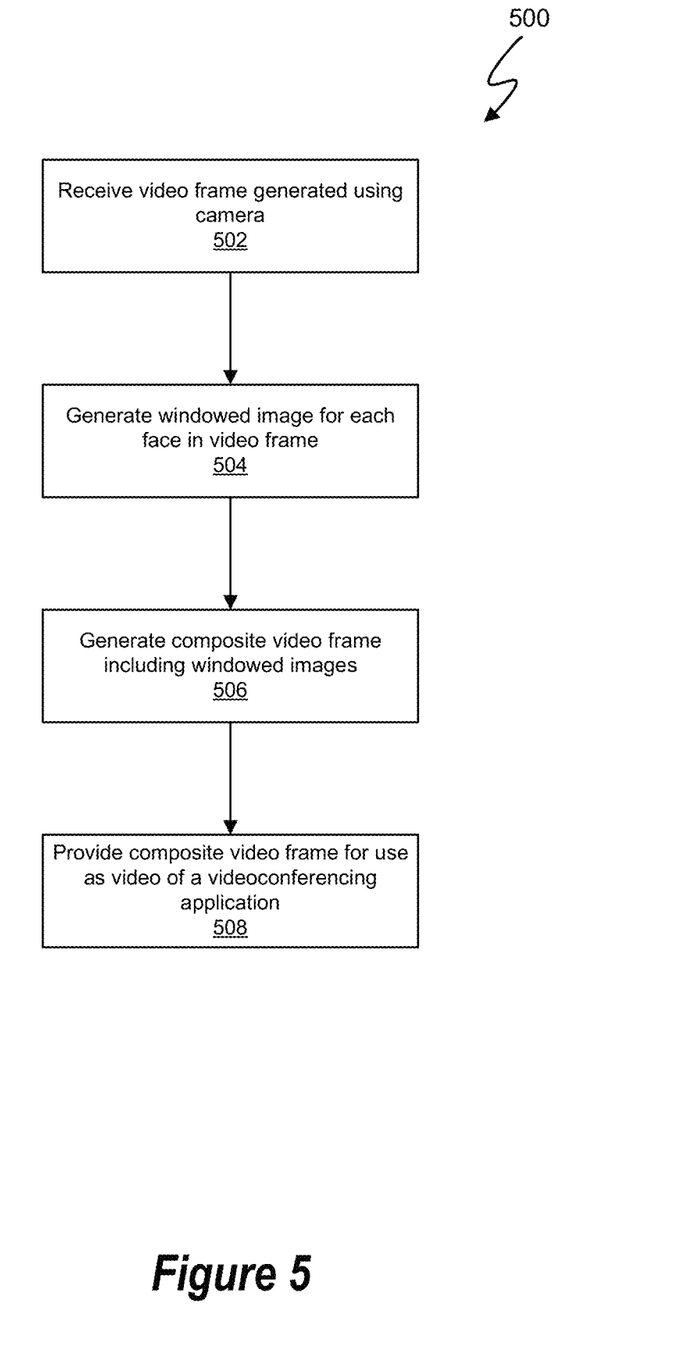
FIG. 5 is a flowchart depicting exemplary operations that may be executed by certain embodiments of the disclosed system.

FIG. 5 is a flowchart 500 depicting exemplary operations that may be executed by certain embodiments of the disclosed system. In this example, a video frame that has been generated using a camera is received at operation 502. A windowed image for each face found in the video frame is generated at operation 504. A composite video frame that includes the windowed images is generated at operation 506. At operation 508, the composited video frame is provided for use as video of a video-conferencing application.

Figure 6:
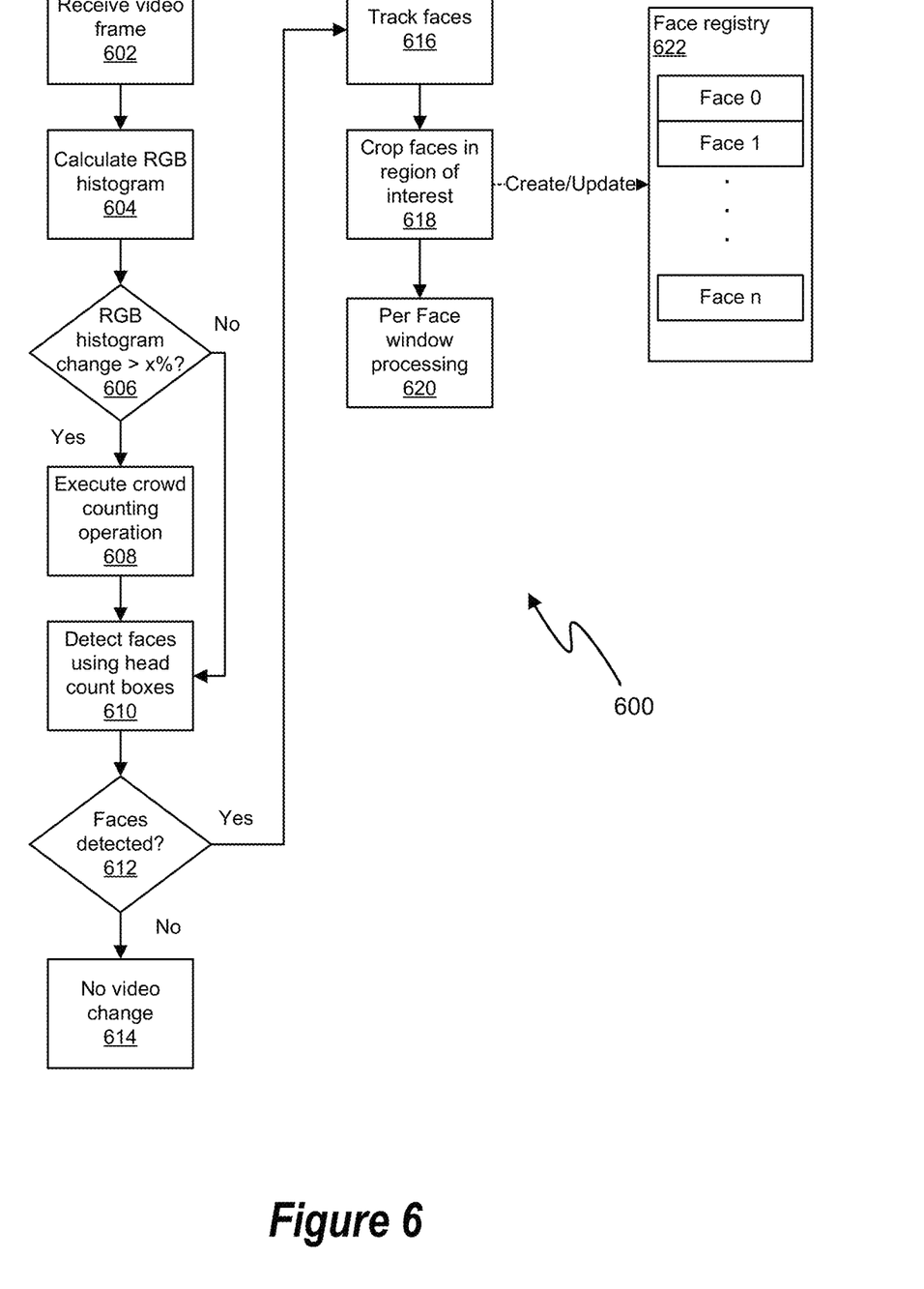
FIG. 6 is a flowchart depicting a further set of exemplary operations that may be executed by certain embodiments of the disclosed system.

FIG. 6 is a flowchart 600 depicting a further set of exemplary operations that may be executed by certain embodiments of the disclosed system. In this example, a video frame is received at operation 602. An RGB histogram for the received video frame is calculated at operation 604. If the received video frame is not the first video frame of a video stream, the RGB histogram of the received video frame is compared against the RGB histogram of one or more prior video frames at operation 606. In certain embodiments, if the change in the RGB histogram (or other parameters indicative of the difference between the characteristics of the video frames) is less than a predetermined amount, certain operations may be bypassed to reduce the processing overhead. For example, if the change in the RGB is less than a predetermined degree, the execution of the crowd counting operation at operation 608 may be bypassed.

If the change in the RGB histogram is greater than a predetermined degree, a crowd counting operation is executed at operation 608 to locate the heads of the participants in the video frame. As noted above, the locations of the heads of the conference participants may be assigned corresponding headcount blocks within the video frame. At operation 610, a face detection operation is executed to extract the facial features of participants in each of the headcount blocks. If no faces are detected as determined at operation 612, the video frame need not be further processed. In such instances, the video frame may be provided directly to the video conferencing application for transmission at operation 614. Additionally, or in the alternative, the video conferencing application may transmit a default video frame using the video-conferencing application.

If faces are detected at operation 612, the position of the faces may be tracked at operation 616. At operation 618, faces within regions of interest are cropped from the video frame and used to update a face registry 622. In certain embodiments, the face registry 622 is used to store facial images located in the cropped regions of interest. In the example shown in FIG. 6, the face registry 622 includes at least one face image for each participant so that a recent face image for each participant is available for potential use in per face window processing operations 620. More than one face image per participant may be stored in the face registry 622 for such use.

Figure 7:
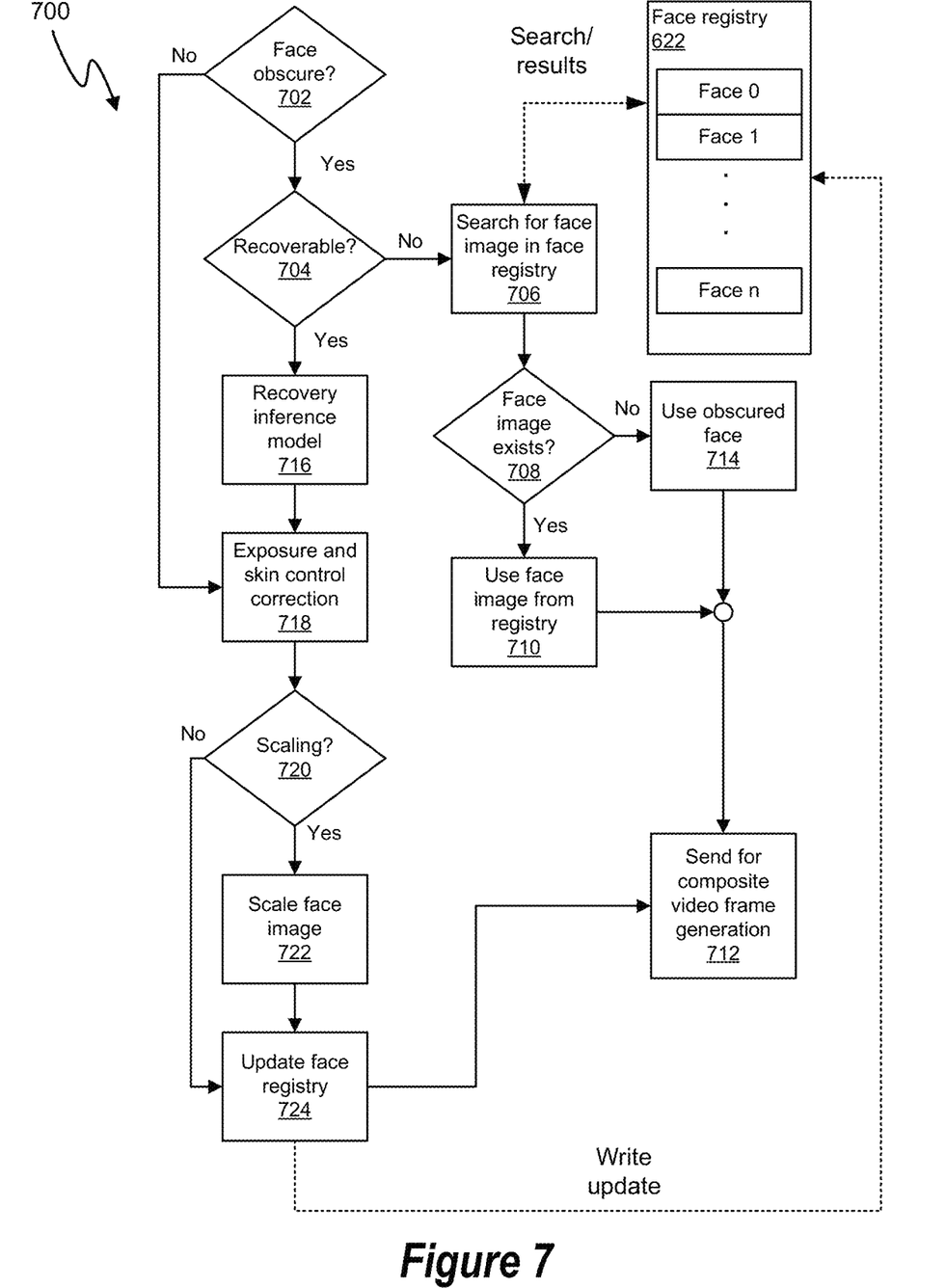
FIG. 7 is a flowchart showing exemplary operations that may be executed to generate windowed images for each facial image of each of the conference participants.

FIG. 7 is a flowchart 700 showing exemplary operations that may be executed to generate windowed images for each facial image of each of the conference participants. In this example, the facial image is analyzed at operation 702 to determine whether the face is partially obscured. If the facial image is not obscured, the facial image may be subject to exposure and skin control correction at operation 718. Certain embodiments make a determination at operation 722 as to whether the facial image should be scaled. If so, the scaling of the facial image takes place at operation 722. Depending on the result of operation 720, either the scaled face image or the image resulting from operation 718 is used to update the face registry 622 at operation 724 so that the face registry 622 includes the latest face image of the participant. Further, the facial image used to update the face registry at operation 724 is sent for use in generating the composite video frame at operation 712.

Certain embodiments include operations that may be used in the event that the face within the facial image is partially obscured. To this end, a threshold determination as to whether the obscured facial image is recoverable is made at operation 704. If it is determined that the obscured facial image is not recoverable, a search of the face registry 622 is made at operation 706 to locate the most recent complete facial image of the participant. If a facial image corresponding to the obscured face is found in the face registry 622 at operation 708, the facial image is retrieved at operation 710 and sent for use in the generation of the composited video frame at operation 712. If the facial image corresponding to the obscured face cannot be located in the face registry 622 at operation 708, the obscured face, default facial image, or avatar may be sent for use at operation 714 and sent for use in the generation of the composited video frame at operation 712.

If a determination is made at operation 704 that a partially obscured face may be recovered, the image of the partially secured face is provided to an input of a trained recovery inference model at operation 716. The trained recovery inference model may be used to infer missing portions of the obscured face and generate a recovered facial image for the participant that includes the existing portions and inferred missing portions of the face of the participant. In certain embodiments, the recovered facial image is subject to exposure and skin control correction at operation 718. Depending on the determination made at operation 720, the recovered facial image is subject to a scaling at operation 722. The resulting recovered facial image is used to update the registry at operation 724 and sent for use in the windowed facial image that is to be included in the composite video frame at operation 712.

Figure 8:
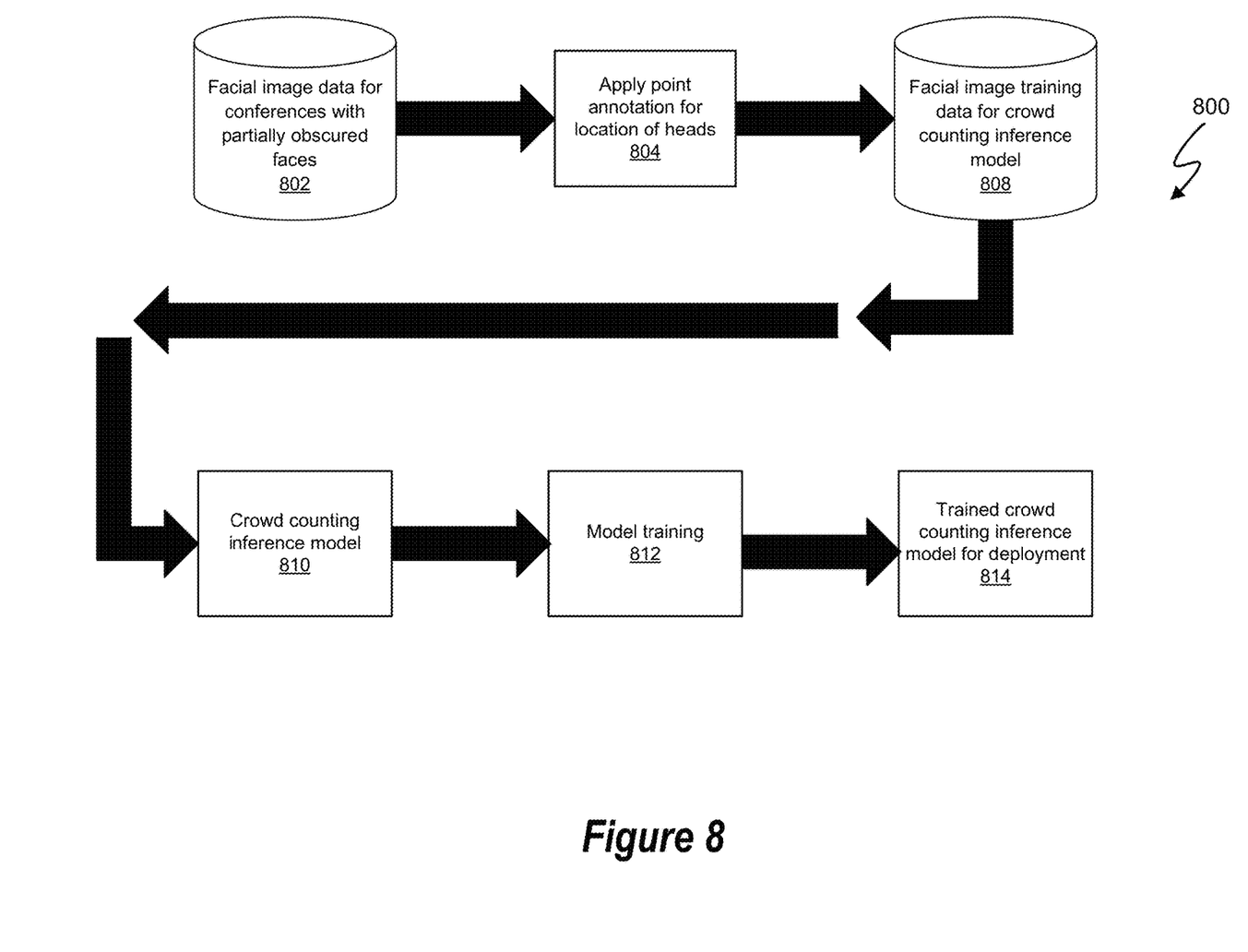
FIG. 8 is a functional flow diagram showing exemplary operations that may be used to generate a trained crowd counting inference model that may be used in certain embodiments of the disclosed system.

FIG. 8 is a functional flow diagram 800 showing exemplary operations that may be used to generate a trained crowd counting inference model that may be used in certain embodiments of the disclosed system. Various crowd counting inference models may be used to locate the heads of the participants within a video frame. One such crowd counting inference model is an LSC-CNN that is disclosed in the paper titled "Locate, Size and Count: Accurately Resolving People in Dense Crowds via Detection." (Sam, Deepak Babu et al. IEEE transactions on pattern analysis and machine intelligence (2020)). A repository including the pytorch implementation for the crowd counting model LSC-CNN is publicly available and found at https://github.com/val-iisc/lsc-cnn.

The LSC-CNN model generates localized boxes on the heads of participants in the video frame image. In certain embodiments, LSC-CNN has three functional parts. In accordance with a first part, features are extracted at multiple resolutions using a Feature Extractor. Feature maps generated by the Feature Extractor are fed to a set of Top-down Feature Modulator (TFM) networks, where information across the scales of the heads are fused and box predictions are made. Then a Non-Maximum Suppression (NMS) operation selects valid detections from multiple resolutions and is combined to generate the final output. For training of the model, the last stage is replaced with the GWTA Loss module, where the winners-take-all (WTA) loss backpropagation and adaptive ground truth box selection are implemented.

In the example shown in FIG. 8, a database 802 of facial images that includes partially obscured facial images of participants in various video conferences is used as a basis to train the crowd counting inference model. The facial image data is annotated for the location of the heads at operation 804 to generate facial image training data 808 for the crowd counting inference model. The training data 808 is provided to the crowd counting inference model at operation 810 and the model is trained at operation 812. At operation 814, the trained crowd counting inference model is ready for deployment and use in the disclosed video layout system.

Figure 9:
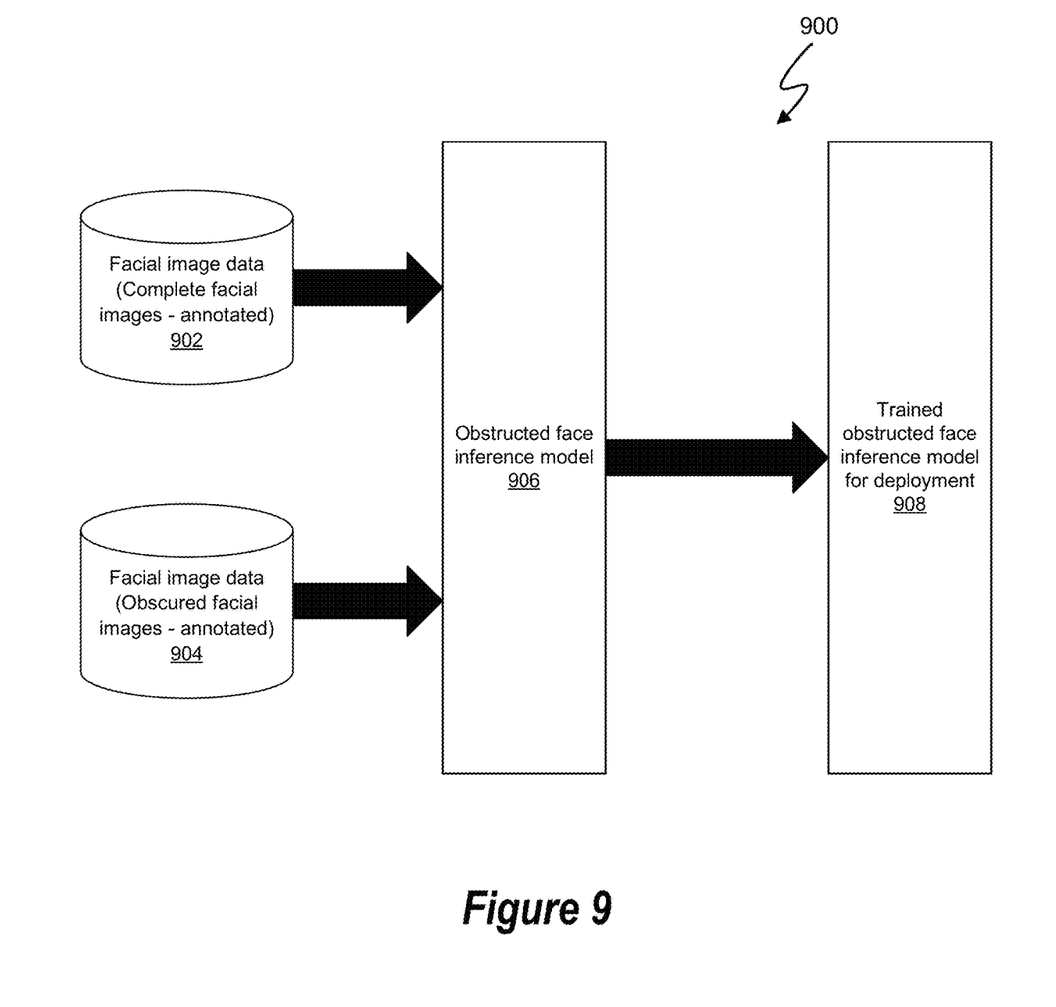
FIG. 9 is a functional flow diagram showing exemplary operations that may be used to generate a trained obstructive face inference model for use in certain embodiments of the disclosed system.

FIG. 9 is a functional flow diagram 900 showing exemplary operations that may be used to generate a trained obstructive face inference model for use in certain embodiments of the disclosed system. In the example shown in FIG. 9, an obstructed face inference model 906 is trained using annotated facial image data 902 having complete facial images, and annotated facial image data 904 including obscured facial images corresponding to the facial images in facial image data 902. Once trained, the trained obstructed face inference model is ready for deployment at operation 908.

Various inference models may be used to generate the trained obstructed face inference model 906. One such model is disclosed in the paper titled "Can adversarial networks hallucinate occluded people with a plausible aspect?" (Fulgeri et al., Computer Vision and Image Understanding 182 (2019) 71-80). The obstructed face inference model may include "U-Net" like architecture. Certain embodiments of the network are composed of 4 down-sampling blocks and a specular number of up-sampling components. Certain embodiments of the down-sampling blocks are comprised of 2 convolutional layers with a 3×3 kernel. Each convolutional layer may be followed by a batch normalization and a ReLU activation. In certain embodiments, each block has a maxpooling layer with stride 2. The up-sampling part in certain embodiments has very similar but overturned structure, where each block is composed by an up-sampling layer of stride 2. After that, each block of certain embodiments is equipped with 2 convolutional layers with a 3×3 kernel. The last block in certain embodiments has an additional 1×1 kernel convolution which is employed to reach the desired number of channels: for example 3 RGB channels. In certain embodiments, a tanh, function may be used as the final activation function. In certain embodiments, skip connections may be inserted between mirrored layers, in the down-sampling and up-sampling streams, in order to shuttle low-level information between input and output directly across the network. In certain embodiments, padding is added to avoid cropping the feature maps coming from the skip connections and concatenate them directly to the up-sampling blocks outputs.

In certain embodiments, the task of the trained obstructive face inference model can be seen as a particular case of image-to-image translation, where a mapping is performed between the input image and the output image. Additionally, input and output may share the same underlying structure despite differing in superficial appearance. Therefore, a rough alignment may be present between the two images in certain embodiments. The non-occluded parts that are visible in the input images may be transferred to the output with no alterations.

As will be appreciated by one skilled in the art, the disclosed system may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A computer-implemented method comprising:
   receiving a video frame from a video source, wherein the video frame includes faces of individuals engaged in a video conference;
   generating, from the received video frame, a windowed image for each face in the video frame, the generating the windowed image comprising executing a crowd counting operation on the video frame to determine a location of each face in the video frame, the crowd counting operation using a trained crowd counting inference model;
   generating a composite video frame including the windowed images; and
   providing the composite video frame for use as video of a video-conferencing application.

2. The computer-implemented method of claim 1, wherein the generating of the windowed images comprises:
   executing a face detection operation using the location of each face as determined by the crowd counting operation, wherein the face detection operation extracts facial features of the faces located in the video frame.

3. The computer-implemented method of claim 2, further comprising:
   using the extracted features of each face to construct a facial image for each face of the individuals in the video frame.

4. The computer-implemented method of claim 3, further comprising:
   determining whether the video frame includes an obstructed facial image; and
   executing a face recovery operation to recover facial features of the obstructed facial image, wherein the face recovery operation restores facial features of the obstructed facial image missing from the video frame to generate a recovered facial image.

5. The computer-implemented method of claim 4, further comprising:
   generating the windowed image for the obstructed facial image using the recovered facial image.

6. The computer-implemented method of claim 3, further comprising:
   scaling the facial images to generate scaled facial images for each of the individuals, wherein the scaled facial images have approximately the same dimensions.

7. The computer-implemented method of claim 5, further comprising:
   generating the windowed images using the scaled facial images.

8. A system comprising:
   one or more information handling systems, wherein the one or more information handling systems include:
     a processor;
     a data bus coupled to the processor; and
     a non-transitory, computer-readable storage medium embodying computer program code, the non-transitory, computer-readable storage medium being coupled to the data bus;
     wherein the computer program code included in one or more of the information handling systems is executable by the processor of the information handling system so that the information handling system, alone or in combination with other information handling systems, executes operations comprising:
       receiving a video frame from a video source, wherein the video frame includes faces of individuals engaged in a video conference;
       generating, from the received video frame, a windowed image for each face in the video frame, the generating the windowed image comprising executing a crowd counting operation on the video frame to determine a location of each face in the video frame, the crowd counting operation using a trained crowd counting inference model;
       generating a composite video frame including the windowed images; and
       providing the composite video frame for use as video of a video-conferencing application.

9. The system of claim 8, wherein the generating of the windowed images comprises:
   executing a face detection operation using the location of each face as determined by the crowd counting operation, wherein the face detection operation extracts facial features of the faces located in the video frame.

10. The system of claim 9, wherein the operations further comprise:
    using the extracted features of each face to construct a facial image for each face of the individuals in the video frame.

11. The system of claim 10, wherein the operations further comprise:
    determining whether the video frame includes a face of an obstructed individual, wherein facial features of the obstructed individual are partially obscured; and
    executing a face recovery operation to recover facial features of the obstructed individual, wherein the face recovery operation restores facial features of the obstructed individual missing from the video frame to generate a recovered facial image.

12. The system of claim 11, wherein the operations further comprise:
    generating the windowed image for the face of the obstructed individual using the recovered facial image.

13. The system of claim 10, wherein the operations further comprise:
    scaling the facial images to generate scaled facial images for each of the individuals, wherein the scaled facial images have approximately the same dimensions.

14. The system of claim 13, wherein the operations further comprise:
    generating the windowed images using the scaled facial images.

15. A non-transitory, computer-readable storage medium embodying computer program code, the computer program code comprising computer-executable instructions configured for executing operations comprising:
    receiving a video frame from a video source, wherein the video frame includes faces of individuals engaged in a video conference;
    generating, from the received video frame, a windowed image for each face in the video frame, the generating the windowed image comprising executing a crowd counting operation on the video frame to determine a location of each face in the video frame, the crowd counting operation using a trained crowd counting inference model;
    generating a composite video frame including the windowed images; and
    providing the composite video frame for use as video of a video-conferencing application.

16. The non-transitory, computer-readable storage medium of claim 15, wherein the generating of the windowed images comprises:
  executing a face detection operation using the location of each face as determined by the crowd counting operation, wherein the face detection operation extracts facial features of the faces located in the video frame.

17. The non-transitory, computer-readable storage medium of claim 16, wherein the operations further comprise:
  using the extracted features of each face to construct a facial image for each face of the individuals in the video frame.

18. The non-transitory, computer-readable storage medium of claim 17, wherein the operations further comprise:
  determining whether the video frame includes an obstructed facial image; and
  executing a face recovery operation to recover facial features of the obstructed facial image, wherein the face recovery operation restores facial features of the obstructed facial image missing from the video frame to generate a recovered facial image.

19. The non-transitory, computer-readable storage medium of claim 18, wherein the operations further comprise:
  generating the windowed image for the obstructed facial image using the recovered facial image.

20. The non-transitory, computer-readable storage medium of claim 17, wherein the operations further comprise:
  scaling the facial images to generate scaled facial images for each of the individuals, wherein the scaled facial images have approximately the same dimensions.

* * * * *